US011698194B2

(12) United States Patent
Lewis et al.

(10) Patent No.: US 11,698,194 B2
(45) Date of Patent: Jul. 11, 2023

(54) SPACE OVEN

(71) Applicant: Nanoracks, LLC, Webster, TX (US)

(72) Inventors: Michael Desmond Lewis, Kemah, TX (US); Caleb Michael Daugherty, League City, TX (US)

(73) Assignee: NANORACKS, LLC, Webster, TX (US)

( * ) Notice: Subject to any disclaimer, the term of this patent is extended or adjusted under 35 U.S.C. 154(b) by 384 days.

(21) Appl. No.: 17/023,353

(22) Filed: Sep. 16, 2020

(65) Prior Publication Data

US 2021/0080181 A1 Mar. 18, 2021

Related U.S. Application Data

(60) Provisional application No. 62/901,133, filed on Sep. 16, 2019.

(51) Int. Cl.
  *F24C 7/00* (2006.01)
  *F24C 15/32* (2006.01)
  (Continued)

(52) U.S. Cl.
  CPC ............... *F24C 7/002* (2013.01); *B64G 1/66* (2013.01); *B64G 7/00* (2013.01); *F24C 15/322* (2013.01);
  (Continued)

(58) Field of Classification Search
  CPC ........ F24C 15/16; F24C 15/322; F24C 15/12; F24C 15/36; F27B 17/0083; A47J 27/04; A23L 5/17
  See application file for complete search history.

(56) References Cited

U.S. PATENT DOCUMENTS 2,851,029 A * 9/1958 Fry ................. F24C 15/08
 126/39 B
4,503,760 A * 3/1985 Pryputsch ............. F24C 15/322
 99/476

(Continued)

FOREIGN PATENT DOCUMENTS

DE 19509569 A1 * 9/1996 .......... F24C 15/2007
DE 19523520 A1 * 1/1997 .............. F24C 15/36
(Continued)

*Primary Examiner* — John J Norton
*Assistant Examiner* — Franklin Jefferson Wang
(74) *Attorney, Agent, or Firm* — Bookoff McAndrews, PLLC

(57) ABSTRACT

A space oven operates in microgravity environments by forcing convection towards the center through a unique heating element and airflow design. The space oven includes a tubular chamber, a heating rack, a heating system, a cooling system, a hatch, a user interface, a microcontroller, an enclosure, at least one first vent, at least one second vent and at least one temperature sensor. The tubular chamber is the cooking area. The heating rack holds consumables in place. The heating system heats up consumables. The cooling system prevents any overheating. The hatch closes off and allows access to the inside of the tubular chamber. The user interface allows a user to input commands. The microcontroller manages the electronic components. The enclosure protects the tubular chamber. The at least one first vent and the at least one second vent reduce pressure buildup. The at least one temperature sensor monitors the internal temperature.

10 Claims, 12 Drawing Sheets

(51) Int. Cl.
  *B64G 7/00* (2006.01)
  *B64G 1/66* (2006.01)
  *F24C 15/30* (2006.01)
  *F24C 15/00* (2006.01)

(52) U.S. Cl.
  CPC ...... *B64G 2007/005* (2013.01); *F24C 15/006* (2013.01); *F24C 15/30* (2013.01)

(56) References Cited

U.S. PATENT DOCUMENTS

| | | | |
|---|---|---|---|
| 4,516,012 A | 5/1985 | Smith et al. | |
| 4,928,663 A | 5/1990 | Nevin | |
| 4,963,091 A | 10/1990 | Hoetzl et al. | |
| 6,380,524 B1 * | 4/2002 | Keller | B65D 81/3453 426/118 |
| 6,513,760 B1 * | 2/2003 | Mueller | B64G 1/62 244/171.1 |
| 6,943,322 B1 * | 9/2005 | Whipple, Jr. | F24C 15/2007 219/400 |
| 10,512,127 B2 * | 12/2019 | Hayashi | F24C 15/322 |
| 2007/0131670 A1 * | 6/2007 | Nam | H05B 6/6408 219/403 |
| 2008/0047542 A1 * | 2/2008 | Hughes | F24C 15/16 126/339 |
| 2008/0087657 A1 * | 4/2008 | Lee | F24C 15/02 219/400 |
| 2009/0025704 A1 * | 1/2009 | Padula | F24C 15/322 126/21 A |
| 2011/0266271 A1 * | 11/2011 | Boyer | F24C 15/00 219/393 |
| 2015/0330642 A1 * | 11/2015 | Vasan | F24C 15/32 219/400 |
| 2016/0348918 A1 * | 12/2016 | Bhogal | F24C 15/04 |
| 2017/0265673 A1 * | 9/2017 | Gustavsson | A47J 27/04 |

FOREIGN PATENT DOCUMENTS

| | | | | |
|---|---|---|---|---|
| DE | 102007043258 A1 * | 3/2009 | | A47J 27/08 |
| EP | 0573599 B1 | 5/1995 | | |
| KR | 20080076310 A * | 8/2008 | | |
| KR | 20120016919 A * | 2/2012 | | |

* cited by examiner ns and microgravity utility devices. More specifically, the present invention provides a space oven intended to test how food items cook in microgravity environments.

SPACE OVEN

The current application claims a priority to the U.S. Provisional Patent application Ser. No. 62/901,133 filed on Sep. 16, 2019.

FIELD OF THE INVENTION

The present invention generally relates to cooking appliances and microgravity utility devices. More specifically, the present invention provides a space oven intended to test how food items cook in microgravity environments.

BACKGROUND OF THE INVENTION

An objective of the present invention is to provide an oven which is used to evaluate cooking in a zero-gravity environment. The lack of natural convection exceeding touch-safe temperature, and the limited food position control in zero gravity relative to oven-heating elements have restricted the use of conventional oven technology in space. The space oven of the present invention is provided as a stand-alone unit with all components pre-installed within an Express Rack Locker Insert without a door. A Velcro-on front cover panel is provided during cooking operations and cooldown to direct air flow across the oven and into the cooling rack area to cool sample trays. Further, the front cover panel encloses sample trays in the cooling rack from exceeding touch temperatures when the space oven is unattended. The space oven is also externally powered and monitored. A digital display screen for internal oven temperature monitoring with menu controls is provided on an airflow plenum.

The space oven provides restraint guiderails designed to provide controlled movement of the sample tray in and out of the oven and preclude contact with the heating elements or standoffs. Separate manual Master Power and Heater Power switches are provided to allow tests, diagnostics, or updates to the control system without powering the heating element. The heating element is sized so a worst-case interior oven temperature of 363 degrees Fahrenheit (° F.) is reached after two hours due to Aerogel insulation properties and continuous 28 Volts direct current (DC) power to the heating element provided from the EXPRESS Rack power supply. A door switch cuts power to the heating element and provides a signal to the controller if the oven door is not closed properly and displays a "DOOR OPEN" warning message on the liquid crystal display (LCD) screen. In addition, the fan controller cuts power to the heating element in event of fan failure/degradation. The present invention includes two independent resistance temperature detectors (RTDs) to measure the oven temperature and provide feedback to the controller to maintain normal operating temperature. Further, an overheat switch that cuts power to the heating element is provided which signals to the controller when the oven reaches a temperature of 392° F. (200 degrees Celsius), triggers a light-emitting diode (LED) light, and displays an "OVERHEAT" warning message on the LCD screen.

DETAIL DESCRIPTIONS OF THE INVENTION

Figure 1:
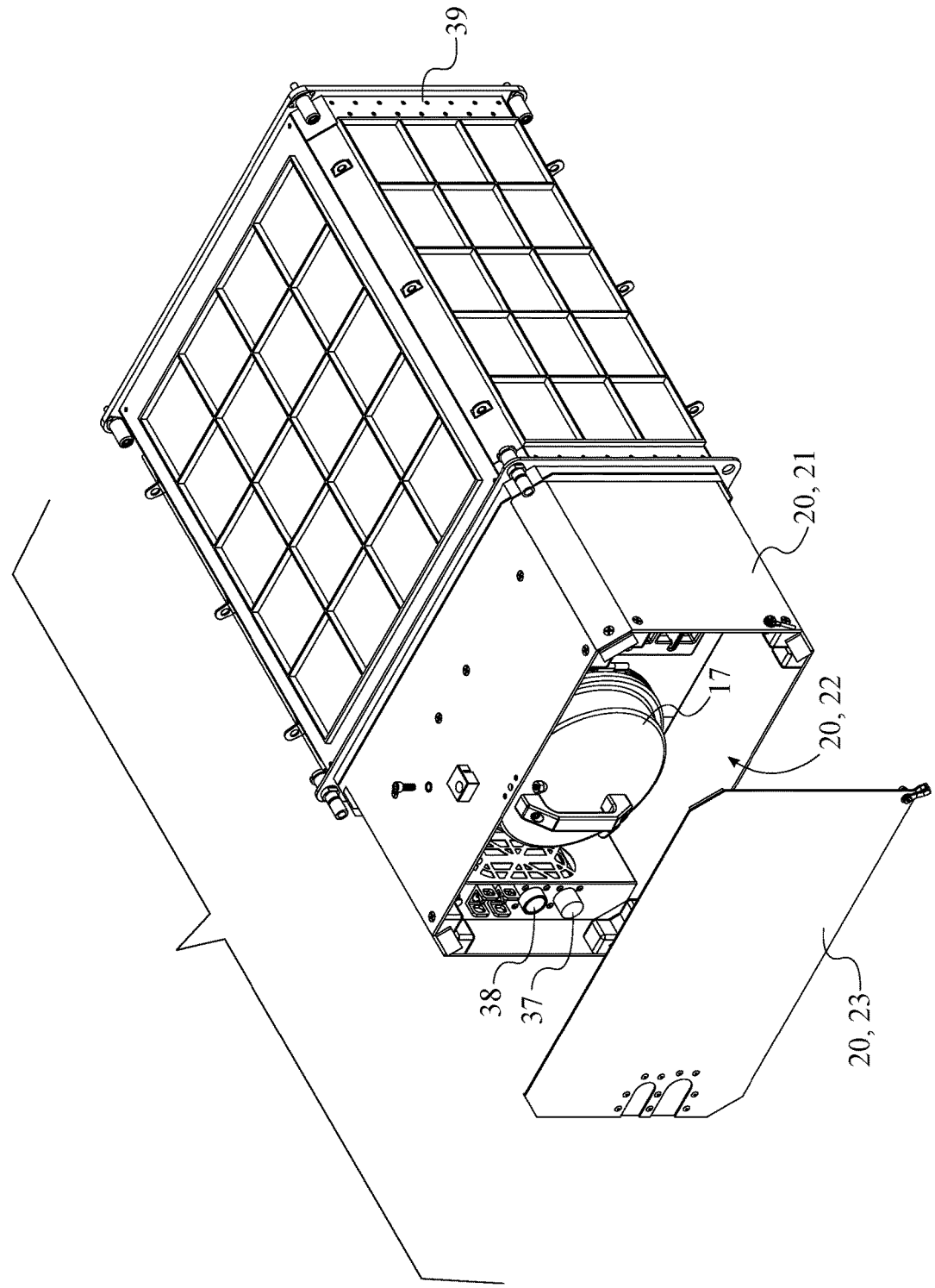
FIG. 1 is an exploded perspective view of the present invention with the international-standard payload rack.

All illustrations of the drawings are for the purpose of describing selected versions of the present invention and are not intended to limit the scope of the present invention.

In reference to FIGS. 1 through 11, the present invention is a space oven intended to test how food items cook in microgravity environments. In further detail, the present invention provides an oven that can operate in microgravity environments by forcing convection towards the center of a cooking chamber through a unique heating element arrangement and airflow design. A preferred embodiment of the present invention comprises a tubular chamber 1, a heating rack 6, a heating system 9, a cooling system 13, a hatch 17, a user interface 18, a microcontroller 19, an enclosure 20, at least one first vent 24, at least one second vent 25, and at least one temperature sensor 26. The tubular chamber 1 is the cooking area of the present invention. The heating rack 6 is used to hold consumables in place within the tubular chamber 1. The heating system 9 provides heat in order to cook consumables placed within the tubular chamber 1. The cooling system 13 prevents the present invention from overheating. The hatch 17 provides a means to close off and access the inside of the tubular chamber 1. The user interface 18 allows a user to input commands in order to heat up consumables. The microcontroller 19 controls and manages the electronic components of the present invention. The enclosure 20 protects the tubular chamber 1 and is designed to establish a unique airflow. The at least one first vent 24 and the at least one second vent 25 prevent the tubular chamber 1 from being a closed system and reduce pressure buildup within the tubular chamber 1. The at least one temperature sensor 26 monitors the temperature within the tubular chamber 1.

Figure 4:
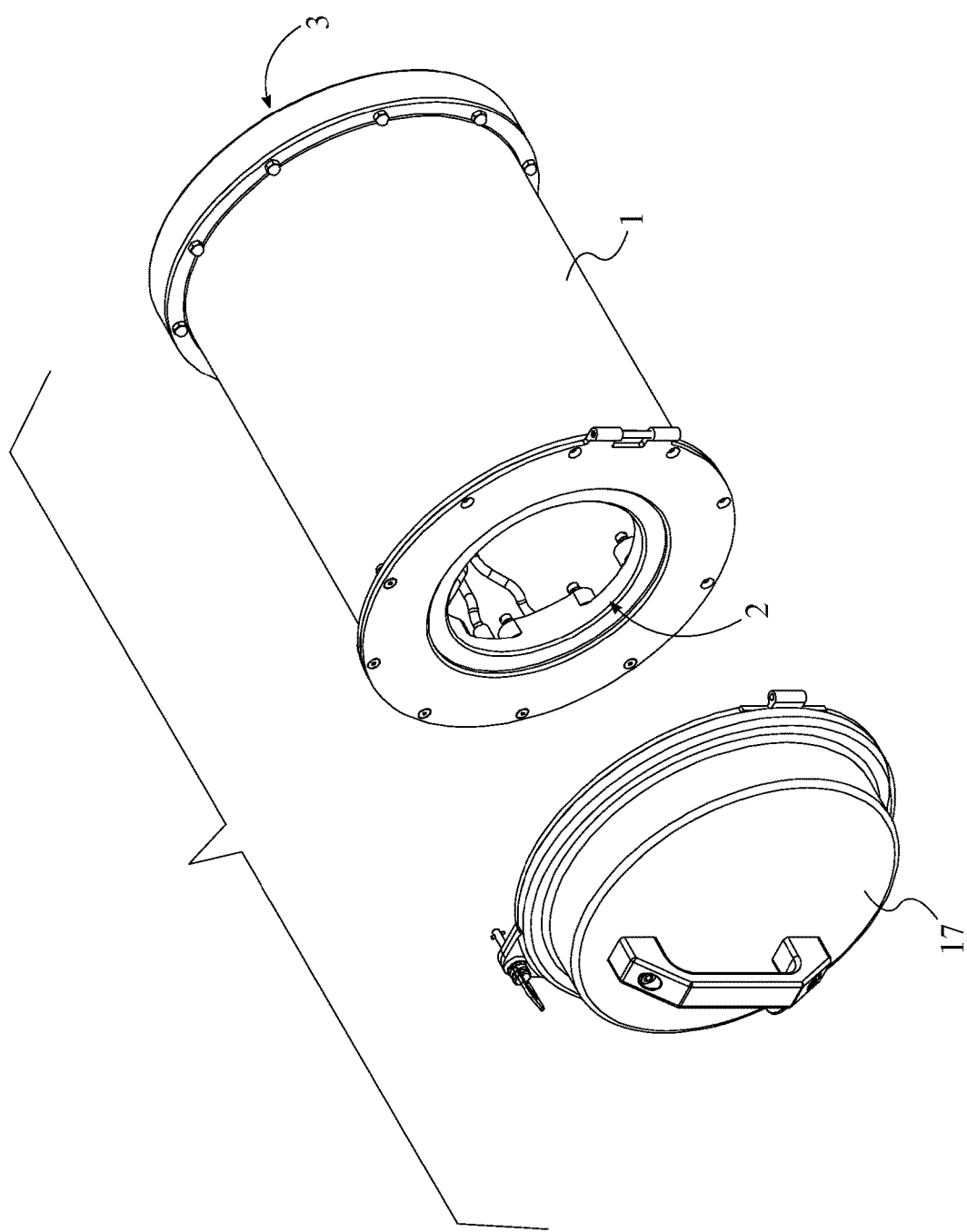
FIG. 4 is an exploded perspective view displaying the hatch detached from the tubular chamber.
Figure 5:
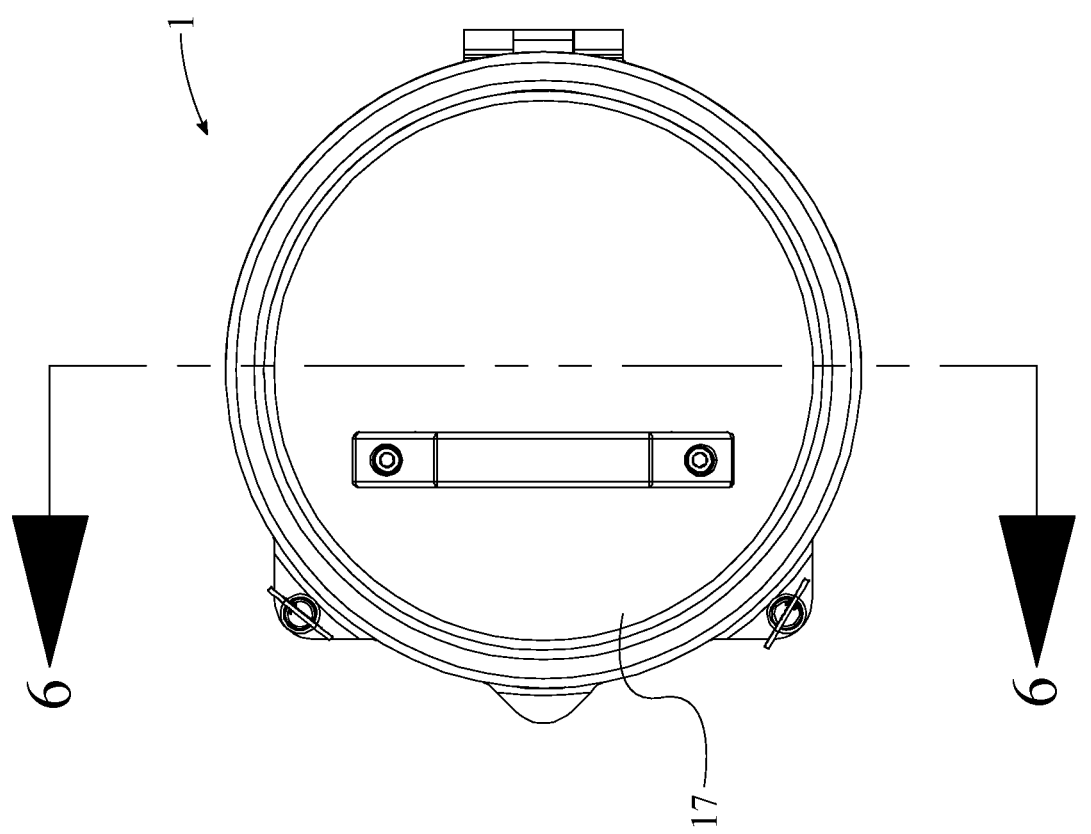
FIG. 5 is a front view of the tubular chamber with the hatch attached.
Figure 6:
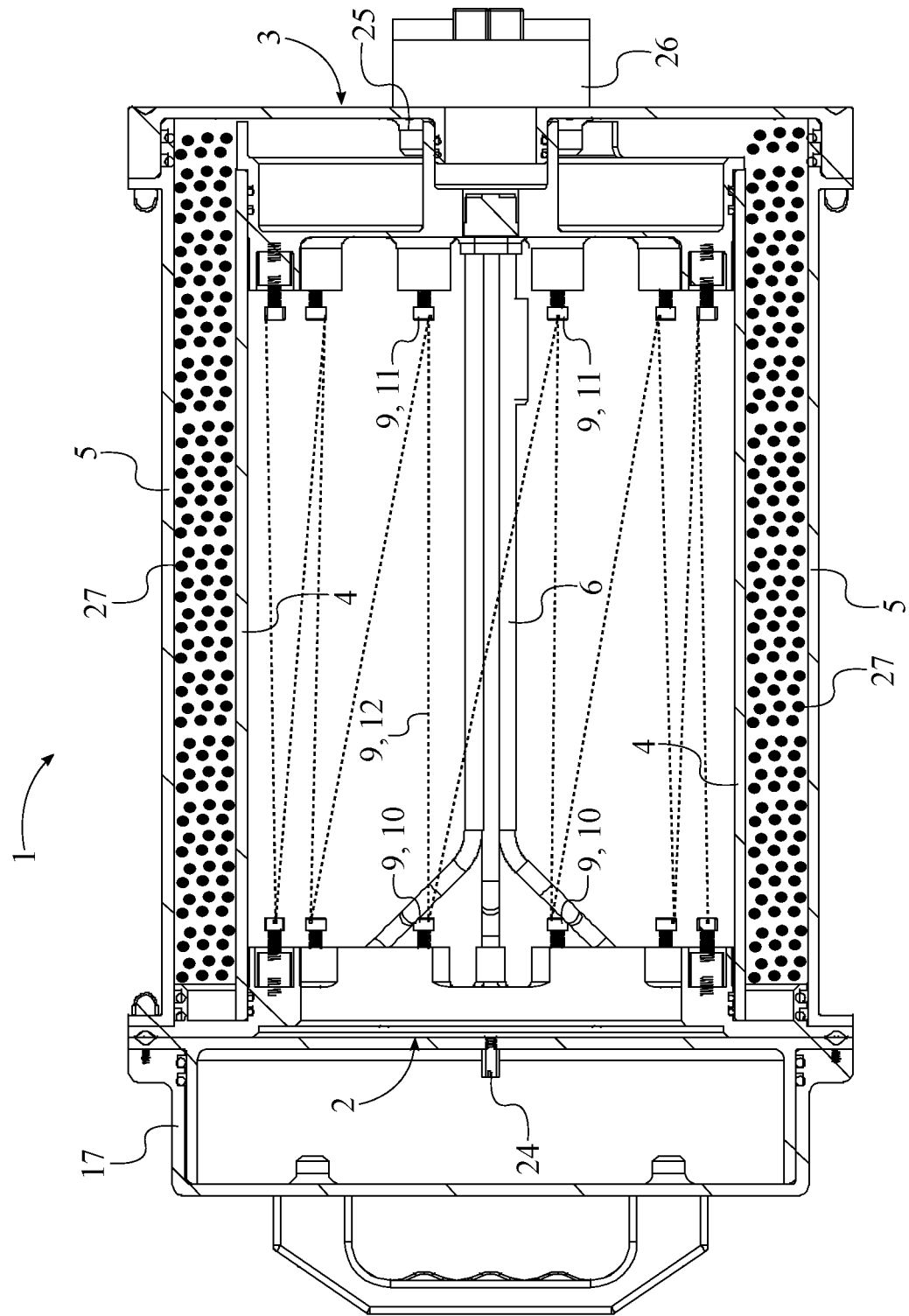
FIG. 6 is a cross-section view taken along line 6-6 from FIG. 5 wherein the dashed line represents the at least one heating wire.
Figure 7:
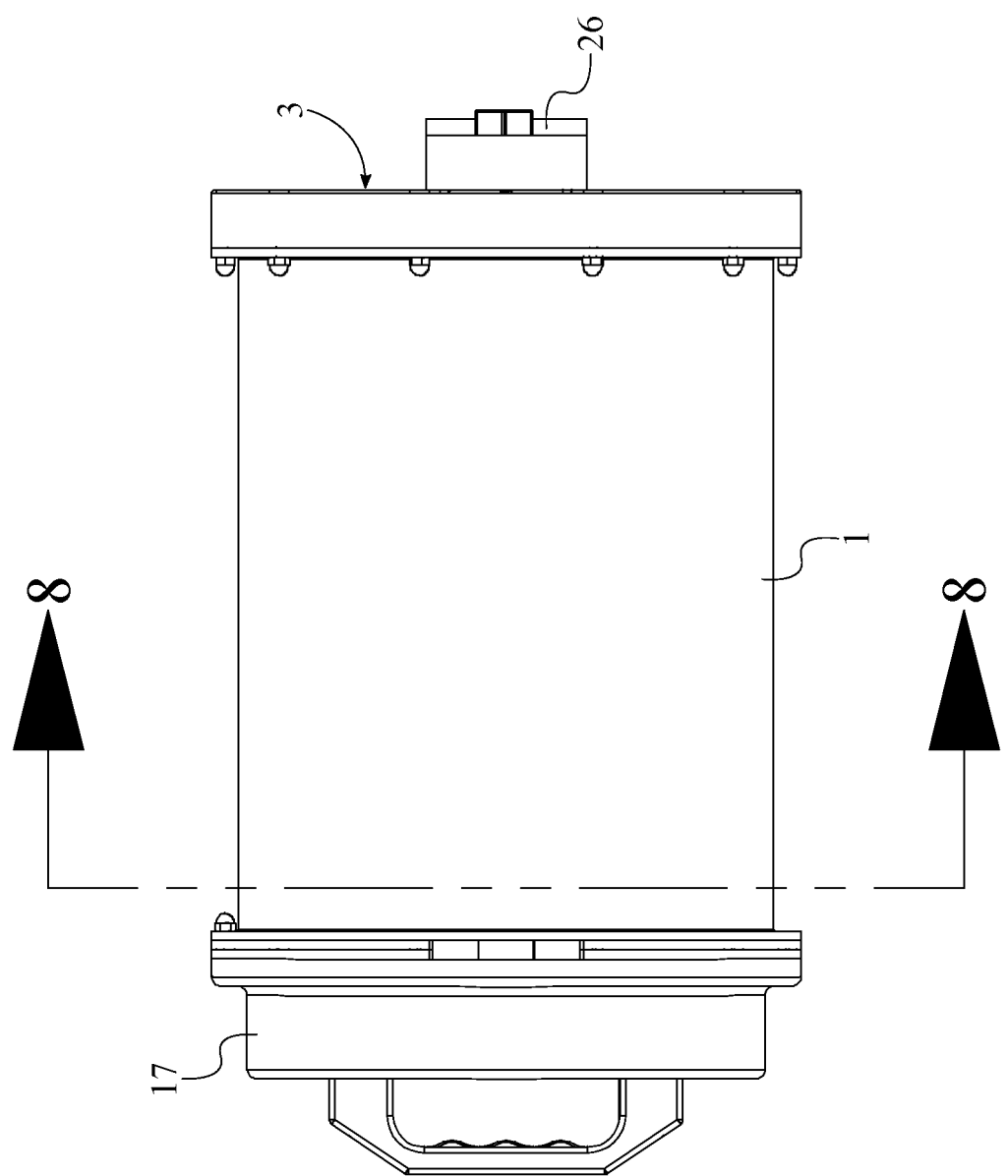
FIG. 7 is a left-side view of the tubular chamber with the hatch attached.
Figure 8:
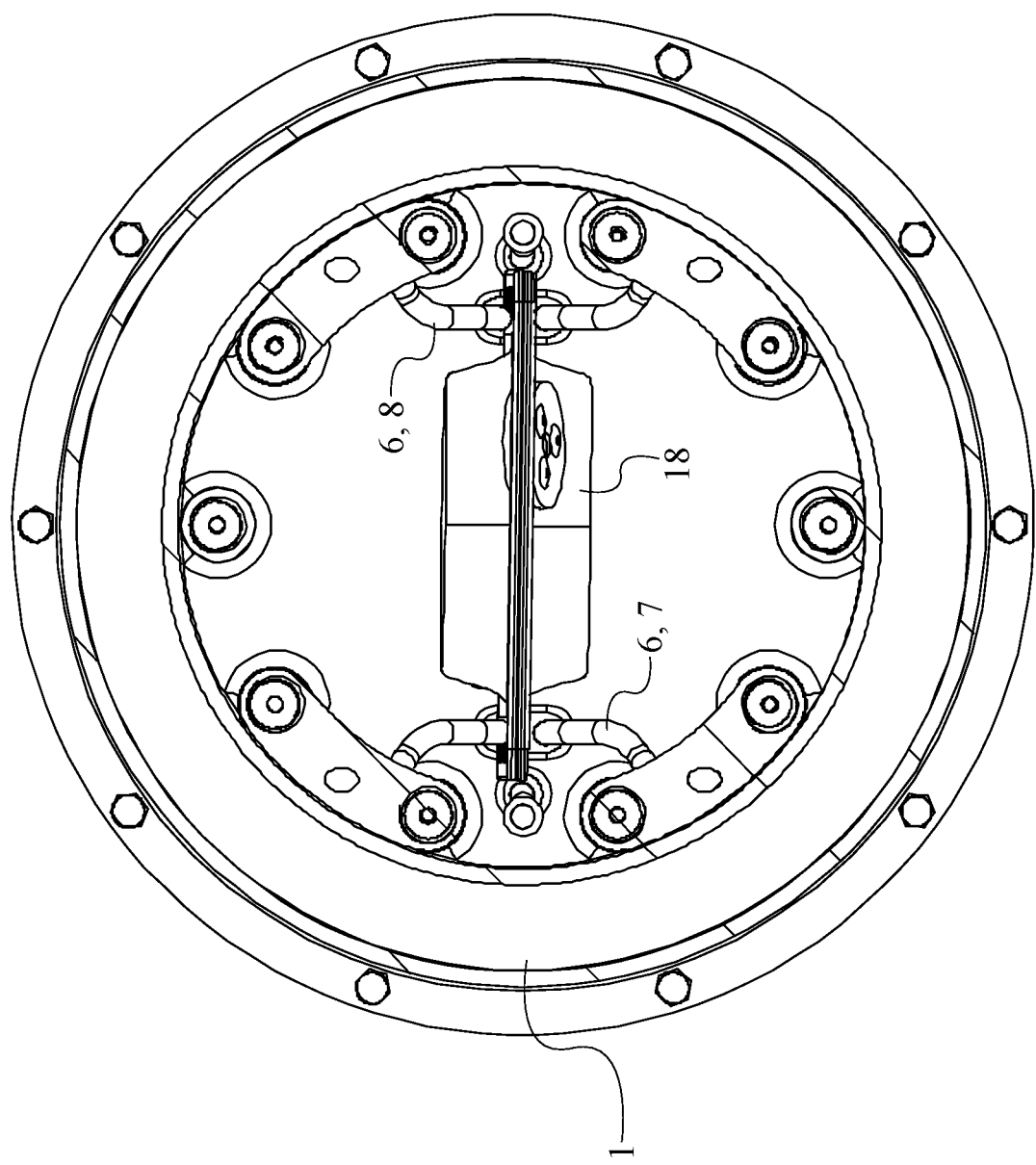
FIG. 8 is a cross-section view taken along line 8-8 from FIG. 7.

The general configuration of the aforementioned components allows the present invention to operate in microgravity environments by forcing convection towards the center of the tubular chamber 1 through a unique heating element arrangement and airflow design. With reference to FIG. 4, the tubular chamber 1 comprises an open chamber end 2 and a closed chamber end 3. The tubular chamber 1 is preferably a double walled cylindrical chamber machined form aluminum and stainless steel. With reference to FIGS. 6 and 8, the heating rack 6 is mounted within the tubular chamber 1 and is centrally positioned along the tubular chamber 1. In further detail, the heating rack 6 is preferably mounted through a set of angled mounting hole. Further, this arrangement prevents the heating rack 6 from rotating within the tubular chamber 1 and allows the heating rack 6 to receive optimal heat from the heating system 9. The heating system 9 is also mounted within tubular chamber 1 and is distributed around the heating rack 6. In further detail, the heating system 9 is preferably mounted through a set of fasteners which are positioned around the heating rack 6. This arrangement distributes heat towards the center of the tubular chamber 1, and therefore, heating is applied to all sides of the heating rack 6. Moreover, standard conditions, air near the inner lateral surface of the tubular chamber 1 would transfer heat to the outer lateral surface of the tubular chamber 1, and that heat will be conducted away to the exterior of the present invention and lost to the environment. However, the arrangement of the heating rack 6, the heating system 9, and the tubular chamber 1 must accommodate for the lack of convection in microgravity. In microgravity conditions, the low thermal conductivity of air will limit the heat from flowing from the pocket of hot air at the center of the tubular chamber 1 to the lateral surface of the tubular chamber 1. Thus, this arrangement allows consumables, placed within the tubular chamber 1, to be exposed to cooking temperatures, while the lateral surface of the tubular chamber 1 remains relatively cool and safe to touch.

Figure 2:
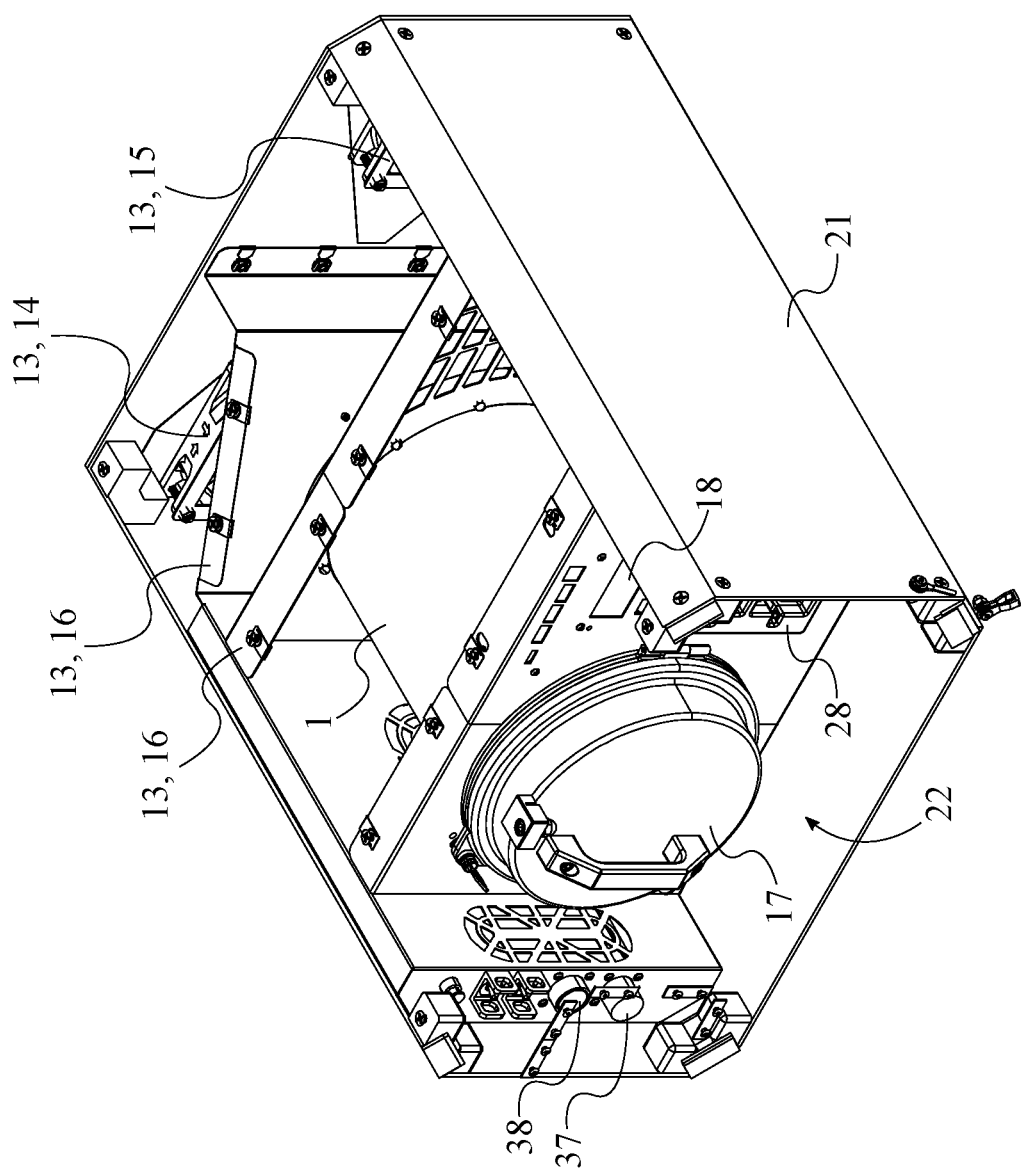
FIG. 2 is a top perspective view of the present invention with the top of the enclosure being exposed.
Figure 3:
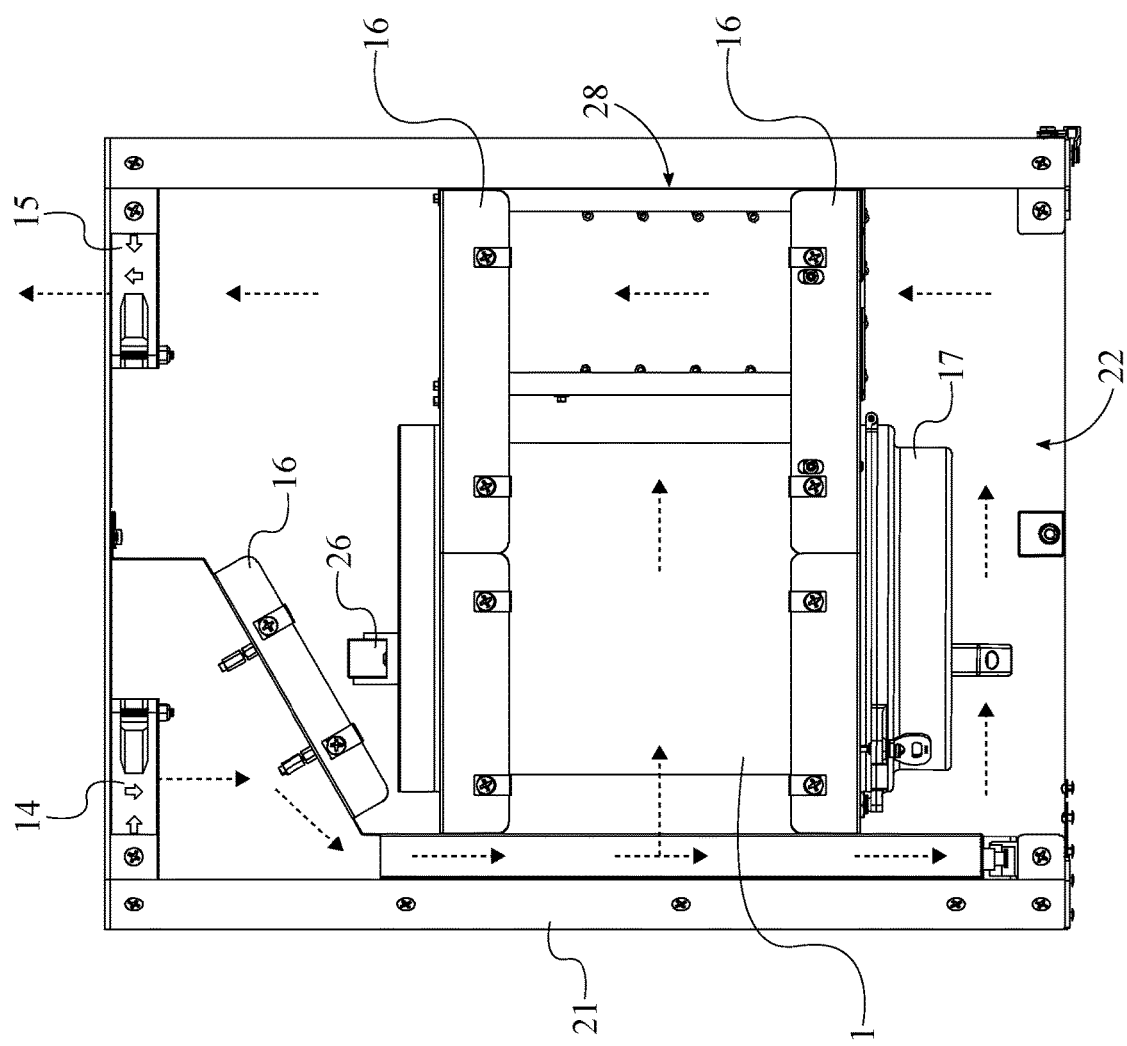
FIG. 3 is a top view of the present invention with the top of the enclosure being exposed and wherein the dashed arrows represent the first airflow path and the second airflow path.

In addition and with reference to FIGS. 2 through 4, the hatch 17 is operatively mounted to the open chamber end 2. The hatch 17 is used to selectively access the open chamber end 2. In further detail, the hatch 17 includes a matching hollow design with a center opening to receive a temperature gauge. The hatch 17 is preferably mounted to the open chamber end 2 with a plurality of O-rings provided in between to seal the connection. Further, the hatch 17 may include a handle to facilitate the safe opening and closing of the hatch 17. With reference to FIG. 6, the at least one first vent 24 is integrated into the hatch 17. In further detail, the at least one first vent 24 is preferably an installation vent that traverses through the hatch 17 in order to prevent pressure buildup during operation of the present invention. Similarly, the at least one second vent 25 is integrated into the closed chamber end 3. The at least one second vent 25 is preferably an installation vent, which is more specifically a 40-micron porous stainless-steel vent. The installation vent of the at least one first vent 24 and the installation vent of the at least one second vent 25 work together to provide a continuous vent design. Therefore, no cracking pressure is required to active the present invention. Further, the 40-micron porous stainless-steel vent of the at least one second vent 25 releases pressure from the tubular chamber 1 when gases expanded during operation of the present invention.

Figure 10:
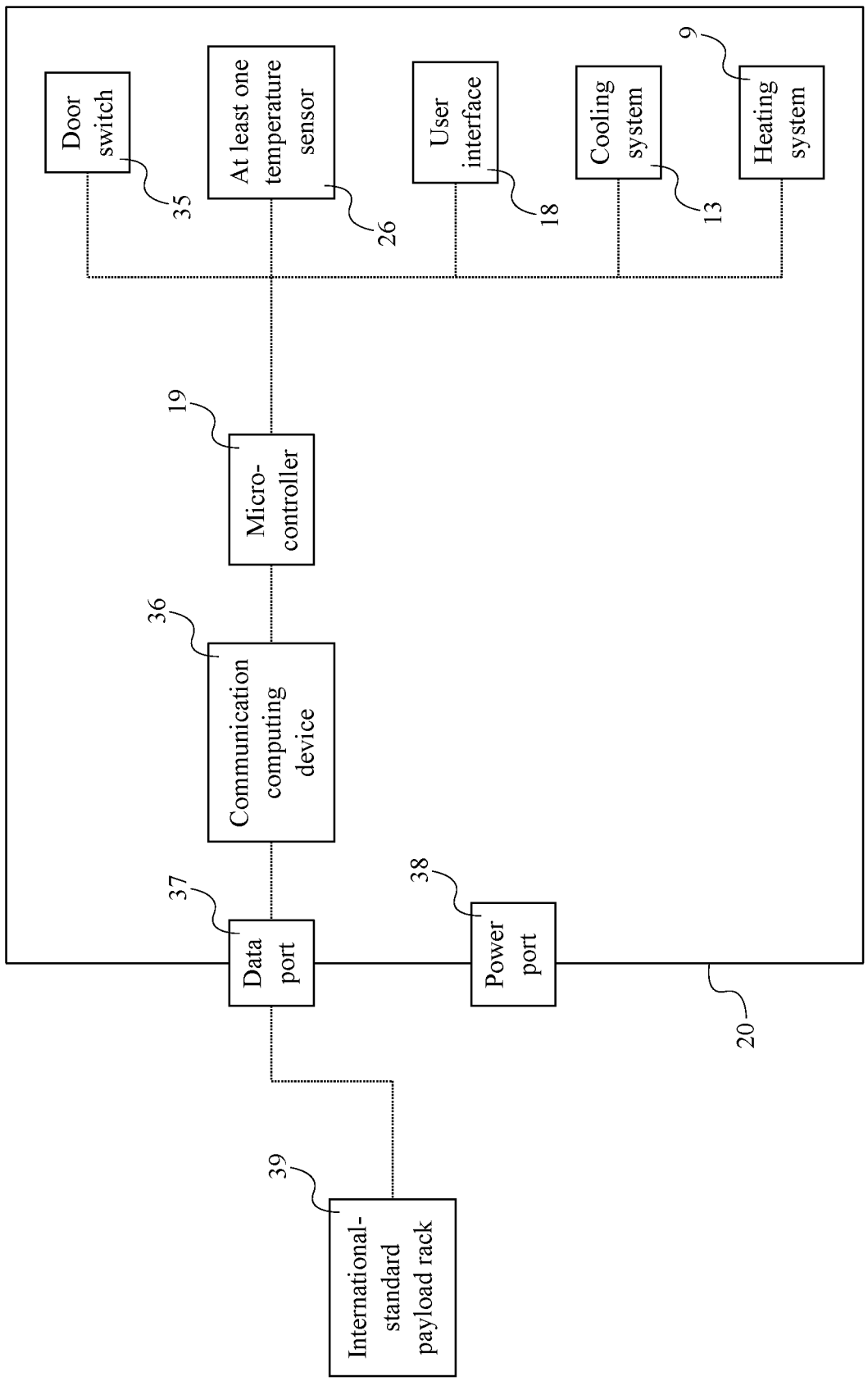
FIG. 10 is a schematic diagram illustrating the electronic connections of the present invention.

Moreover and with reference to FIGS. 3 and 10, the tubular chamber 1, the microcontroller 19, and the user interface 18 are mounted within the enclosure 20. Thus, the tubular chamber 1, the microcontroller 19, and the user interface 18 are protected by the enclosure 20 and held in place within the enclosure 20. In further detail, the tubular chamber 1 is preferably mounted within the enclosure 20 through at least one fastening bracket. The cooling system 13 is integrated into the enclosure 20. In further detail, the cooling system 13 traverses through the backend of the enclosure 20 to direct cool air into the enclosure 20 while simultaneously pulling hot air out of the enclosure 20. The at least one temperature sensor 26 is mounted into the closed chamber end 3. In further detail, the at least one temperature sensor 26 is preferably mounted through a hole in the closed chamber end 3 by a set of fasteners. Moreover, this arrangement is sealed with a high-temperature room temperature vulcanizing (RTV) sealant.

Furthermore and with reference to FIG. 10, the microcontroller 19 is electronically connected to the heating system 9, the cooling system 13, the user interface 18, and the at least one temperature sensor 26. Thus, the microcontroller 19 can manage and control the heating system 9, the cooling system 13, the user interface 18, and the at least one temperature sensor 26. The microcontroller 19 is preferably an AT Mega 32U4 microcontroller 19. The user interface 18 can be any type of user interface 18 such as, but not limited to, a touch-screen display screen or a liquid crystal display (LCD) screen with a plurality of control buttons. Inputs from the user interface 18 are monitored by the microcontroller 19, and a context dependent menu is displayed on the user interface 18. Nominal operation of the present invention begins with turning on the "Master Power" and "Heater Power" switches of the user interface 18. The LCD screen of the user interface 18 shows a context dependent menu that allows the operator to use the three pushbuttons of the user interface 18 to cycle through and select options. A user can select a "Preheat" temperature, or a "Cook" temperature and cooking time, or enter an options menu to change oven settings. Oven temperature can be set in 5-degree increments, and time can be set in one-minute increments. Once an oven temperature is set by the user, the microcontroller 19 operates as a two-state controller to cycle the heating system 9 on and off to maintain the internal temperature of the tubular chamber 1. A ±3° hysteresis is built into the control program to prevent the microcontroller 19 from switching at high frequency when the present invention reaches its set temperature. The microcontroller 19 monitors the internal temperature of the tubular chamber 1 via the at least one temperature sensor 26 which preferably includes a set of platinum resistive temperature devices (RTDs) and controls a solid-state relay (SSR) to apply power to the heating system 9. The at least one temperature sensor 26 may also include an automated shutoff thermostat that automatically disables the heating system 9 if a high-temperature threshold is reached. The microcontroller 19 monitors and manages the air temperature in the enclosure 20 around the user interface 18 and the tubular chamber 1 by the cooling system 13.

With reference to FIG. 6, the present invention may further comprise a quantity of insulation material 27 in order to prevent the release of heat from the inside of the tubular chamber 1. As mentioned previously, the tubular chamber 1 is preferably a double-walled cylindrical chamber and, thus, comprises an inner lateral wall 4 and an outer lateral wall 5. The inner lateral wall 4 is concentrically encircled by the outer lateral wall 5. The quantity of insulation material 27 is preferably compressed granulated Aerogel insulation and is positioned between the inner lateral wall 4 and the outer lateral wall 5. Thus, this arrangement prevents the release of heat from the inside of the present invention. Similarly, the hatch 17 may also be doubled-walled like the tubular chamber 1 and filled with the same insulation.

In order for the heating system 9 to effectively distribute heat towards the center of the tubular chamber 1 and with reference to FIG. 6, the heating system 9 comprises a plurality of first standoffs 10, a plurality of second standoffs 11, and at least one heating wire 12. The plurality of first standoffs 10 is mounted adjacent to the open chamber end 2. In further detail, the plurality of first standoffs 10 is preferably a set of ceramic standoffs that are recessed into aluminum bosses and encapsulated with a high-temperature RTV sealant to prevent debris from being released into a space station environment in case of accidental shattering of the ceramic material. Fasteners such as stainless-steel screws are mounted in each of the plurality of first standoffs 10. Similarly, the plurality of second standoffs 11 is mounted adjacent to the closed chamber end 3. In further detail, the plurality of second standoffs 11 is preferably a set of ceramic standoffs that are recessed into aluminum housings and encapsulated with a high-temperature RTV sealant to prevent debris from being released into a space station environment in case of accidental shattering of the ceramic material. Fasteners such as stainless-steel screws are mounted in each of the plurality of second standoffs 11. The fastener of the plurality of first standoffs 10 and the fasteners of the plurality of second standoffs 11 provide electrically insulated mounting points for the at least one heating wire 12. The at least one heating wire 12 is preferably a nichrome 80 wire. The plurality of first standoffs 10 and the plurality of second standoffs 11 are distributed around the heating rack 6, and the at least one heating wire 12 is strung in between the plurality of first standoffs 10 and the plurality of second standoffs 11. Thus, this arrangement effectively distributes heat towards the center of the tubular chamber 1.

In order for the cooling system 13 to effectively prevent the present invention from overheating and with reference to FIG. 2, the cooling system 13 comprises an inlet fan assembly 14, an outlet fan assembly 15, and a plurality of airflow-guiding panels 16. The inlet fan assembly 14 and the outlet fan assembly 15 are positioned adjacent to the closed chamber end 3. In further detail, the inlet fan assembly 14 and the outlet fan assembly 15 are preferably mounted into the backend of the enclosure 20. The inlet fan assembly 14 is positioned offset from the outlet fan assembly 15. The inlet fan assembly 14 is in fluid communication with the outlet fan assembly 15 through the plurality of airflow-guiding panels 16, the at least one first vent 24, and the at least one second vent 25. In further detail, the inlet fan assembly 14 directs cool air into the enclosure 20 through the air-flow guiding panels 16, and the outlet fan assembly 15 pulls hot air out of the enclosure 20 while the at least one first vent 24 and the at least one second vent 25 slowly reduce pressure from the inside of the tubular chamber 1 by letting out gas. With reference to FIG. 3, a first airflow path is delineated from the inlet fan assembly 14, in between the open chamber end 2 and the closed chamber end 3 (i.e. about the lateral surface of the tubular chamber 1) and to the outlet fan assembly 15. The first airflow path provides a forced convection over the tubular chamber 1. A second airflow path is delineated from the inlet fan assembly 14, across the hatch 17, and to the outlet fan assembly 15. The second airflow path cools the user interface 18 and the microcontroller 19. In the preferred embodiment, the user interface 18 is mounted onto one of the plurality of airflow-guiding panels 16, and the microcontroller 19 is mounted within the same airflow-guiding panel. Thus, the tubular chamber 1 and the electronic components of the present invention can be cooled by the cooling system 13. The inlet fan assembly 14 and the outlet fan assembly 15 may each include a fan controller that monitors the air temperature inside the enclosure 20 around the electronic components of the present invention and the tubular chamber 1. The fan controller reports fan failures or off-nominal temperature conditions to the microcontroller 19.

With reference to FIGS. 2 and 3, the present invention may further comprise at least one cooling rack 28 in order to allow consumables to cool after being heated by the present invention. The at least one cooling rack 28 is mounted within the enclosure 20 and is positioned adjacent to the open chamber end 2. In further detail, the at least one cooling rack 28 is preferably mounted in between two of the plurality of airflow-guiding panels 16. The first airflow path and the second airflow path are intersected by the at least one cooling rack 28. In further detail, cool air is drawn into an inlet airflow-guiding panel from the plurality of airflow-guiding panels 16 by the inlet fan assembly 14 and directed over the electronic components of the present invention. The cool air is then directed by vents to flow over the tubular chamber 1, the hatch 17, and the at least one cooling rack 28.

With reference to FIG. 8, the present invention may further comprise a heating tray 29 in order to safely heat consumables within the tubular chamber 1. The heating rack 6 comprises a first track 7 and a second track 8. The first track 7 and the second track 8 are each preferably a set of stainless-steel tubing. The first track 7 and the second track 8 traverse from the open chamber end 2 to the closed chamber end 3. Further, the first track 7 and the second track 8 are positioned opposite to each other within the tubular chamber 1. This arrangement prevents consumables, placed on the heating rack 6, from rotating within the tubular chamber 1. The heating tray 29 is slidably engaged in between the first track 7 and the second track 8. Thus, heating tray 29 is held in place by the heating rack 6.

Figure 9A:
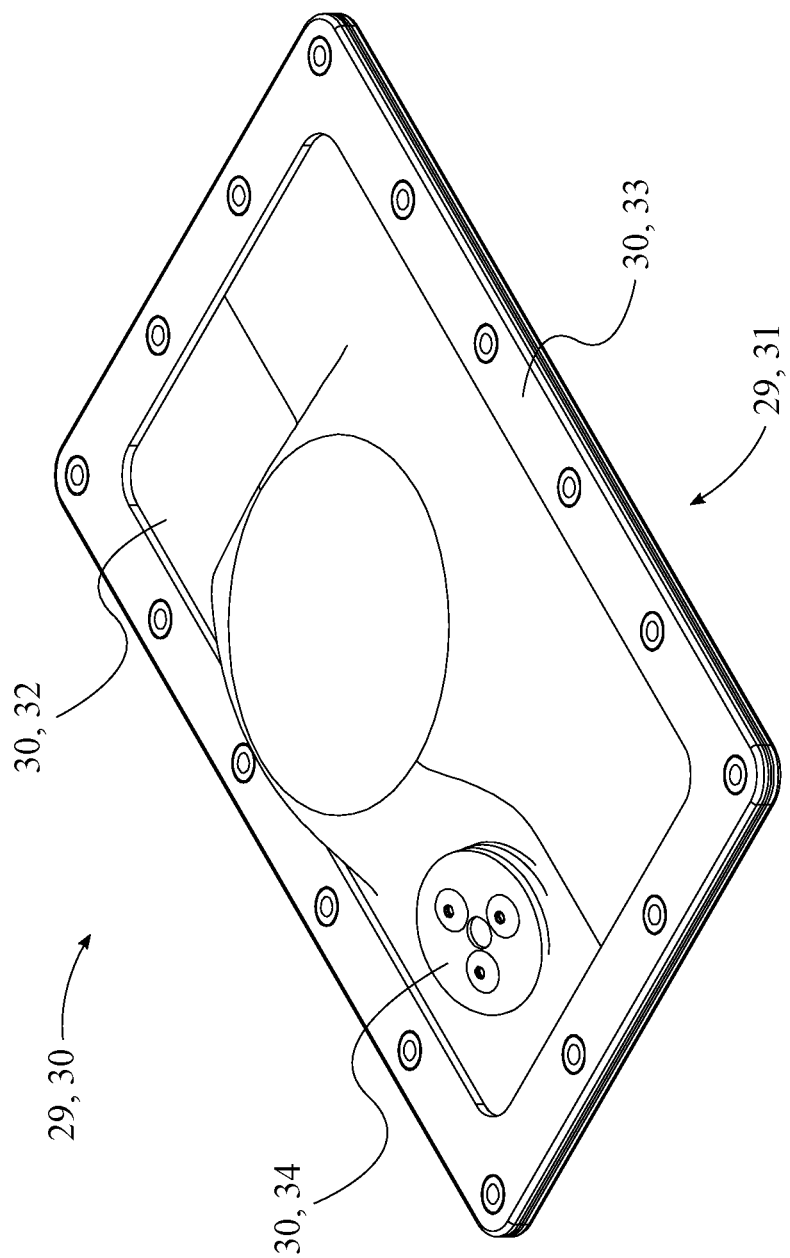
FIG. 9A is a top perspective view of the heating tray.
Figure 9B:
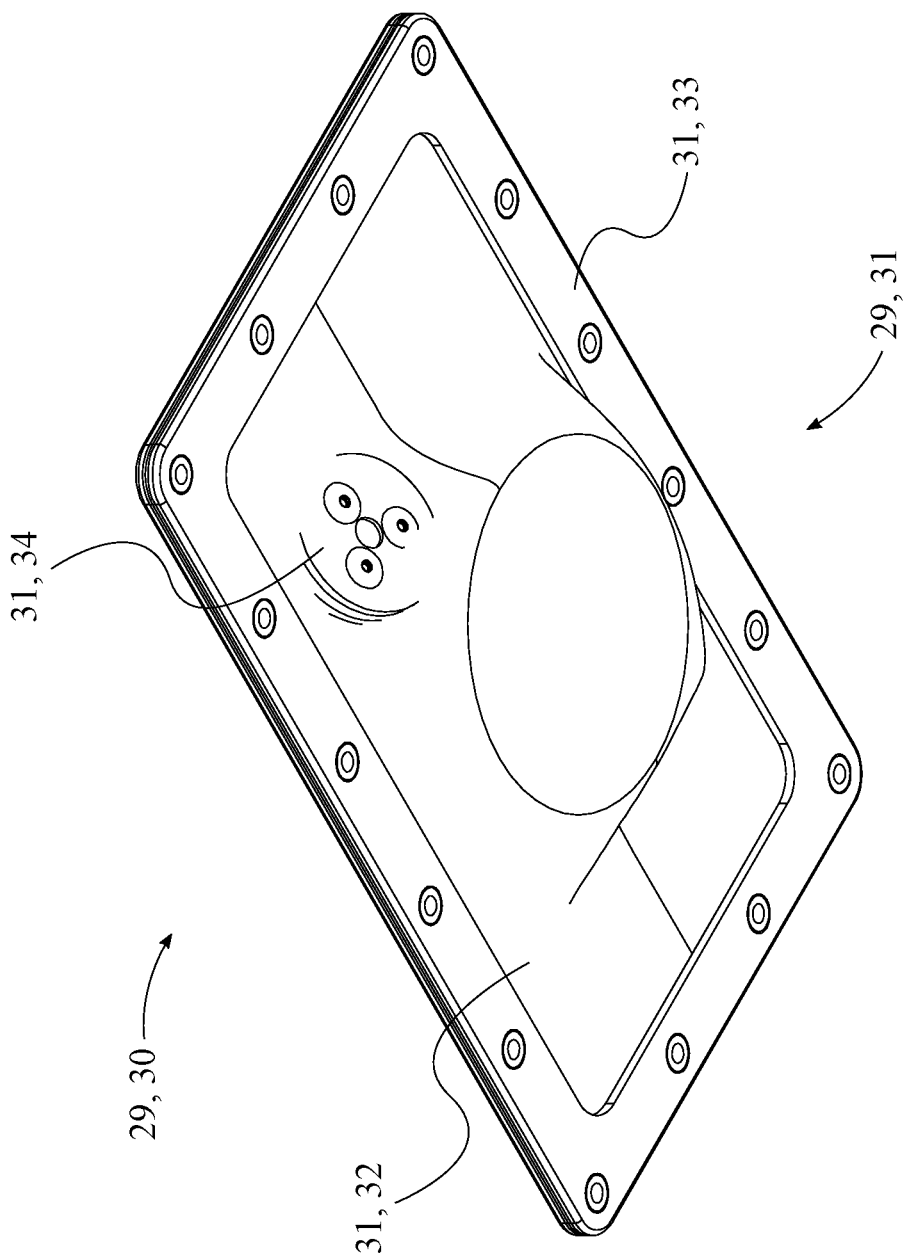
FIG. 9B is a bottom perspective view of the heating tray.

In order for the heating rack 6 to safely seal consumables in preparation to be heated by the present invention and with reference to FIGS. 9A and 9B, the heating tray 29 may further comprise a first sealing assembly 30 and a second sealing assembly 31. The first sealing assembly 30 and the second sealing assembly 31 each comprise a flexible sheet 32, a rigid frame 33, and a pressure-release valve 34. The flexible sheet 32 is preferably a silicone sheet. The rigid frame 33 is preferably a rectangular, aluminum frame. The pressure-release valve 34 is preferably a 40-micron vent. The pressure-release valve 34 is integrated into the flexible sheet 32. This arrangement prevents pressure build within the heating tray 29. The rigid frame 33 is perimetrically connected around the flexible sheet 32. This arrangement allows the rigid frame 33 to border the flexible sheet 32. Further, the rigid frame 33 of the first sealing assembly 30 is hermetically connected to the rigid frame 33 of the second sealing assembly 31. This arrangement ensures an air-tight seal for the heating tray 29 to package cookable consumables. Moreover, the rigid frame 33 allows the heating tray 29 to be slidably engaged in between the first track 7 and the second track 8.

In order for the enclosure 20 to protect the tubular chamber 1 and the electronic components of the present invention while still allowing access to the tubular chamber 1 and the electronic components of the present invention and with reference to FIG. 1, the enclosure 20 comprises a receptacle 21 and a cover 23. The receptacle 21 comprises an opening 22. With reference to FIG. 2, the open chamber end 2, the user interface 18, and the microcontroller 19 are positioned adjacent to the opening 22. This arrangement allows a user to easily access the inside of the tubular chamber 1 and the user interface 18. Further, the cooling system 13 is positioned opposite to the opening 22 about the enclosure 20. This allows the cooling system 13 to easily direct cool air into and pull hot air from the enclosure 20. The receptacle 21 is perimetrically attached to the cover 23, and the cover 23 is positioned across the opening 22. The cover 23 can be perimetrically attached to the cover 23 by any fastening mechanism but is preferably attached to the cover 23 through a hook-and-loop fastener. Thus, the tubular chamber 1 and the user interface 18 can be accessed by detaching the cover 23 from the receptacle 21.

In order to provide a safety measure to the operation of the present invention and with reference to FIG. 10, the present invention may further comprise a door switch 35. The door switch 35 is operatively integrated in between the hatch 17 and the open chamber end 2. The door switch 35 is used to detect a closed configuration for the hatch 17 and an open configuration for the hatch 17. The microcontroller 19 is electronically connected to the door switch 35. In further detail, the door switch 35 shuts off power to the heating system 9 when a user opens the hatch 17 to insert or remove consumables or in case the hatch 17 is not closed and secured properly.

In order for the microcontroller 19 to be monitored and updated and with reference to FIG. 10, the present invention may further comprise a communication computing device 36. The communication computing device 36 is preferably a BeagleBone black single-board computer that monitors the payload and provides an interface for ground controllers to interact with the present invention. The communication computing device 36 monitors the fan controllers for fan failures or off nominal temperature conditions and records the plenum temperatures to a log file. The communication computing device 36 is mounted within the enclosure 20 and is electronically connected to the microcontroller 19. This arrangement allows the communication computing device 36 to interface with the microcontroller 19 and allows updates and new operational programs to be uploaded to the microcontroller 19.

Figure 11:
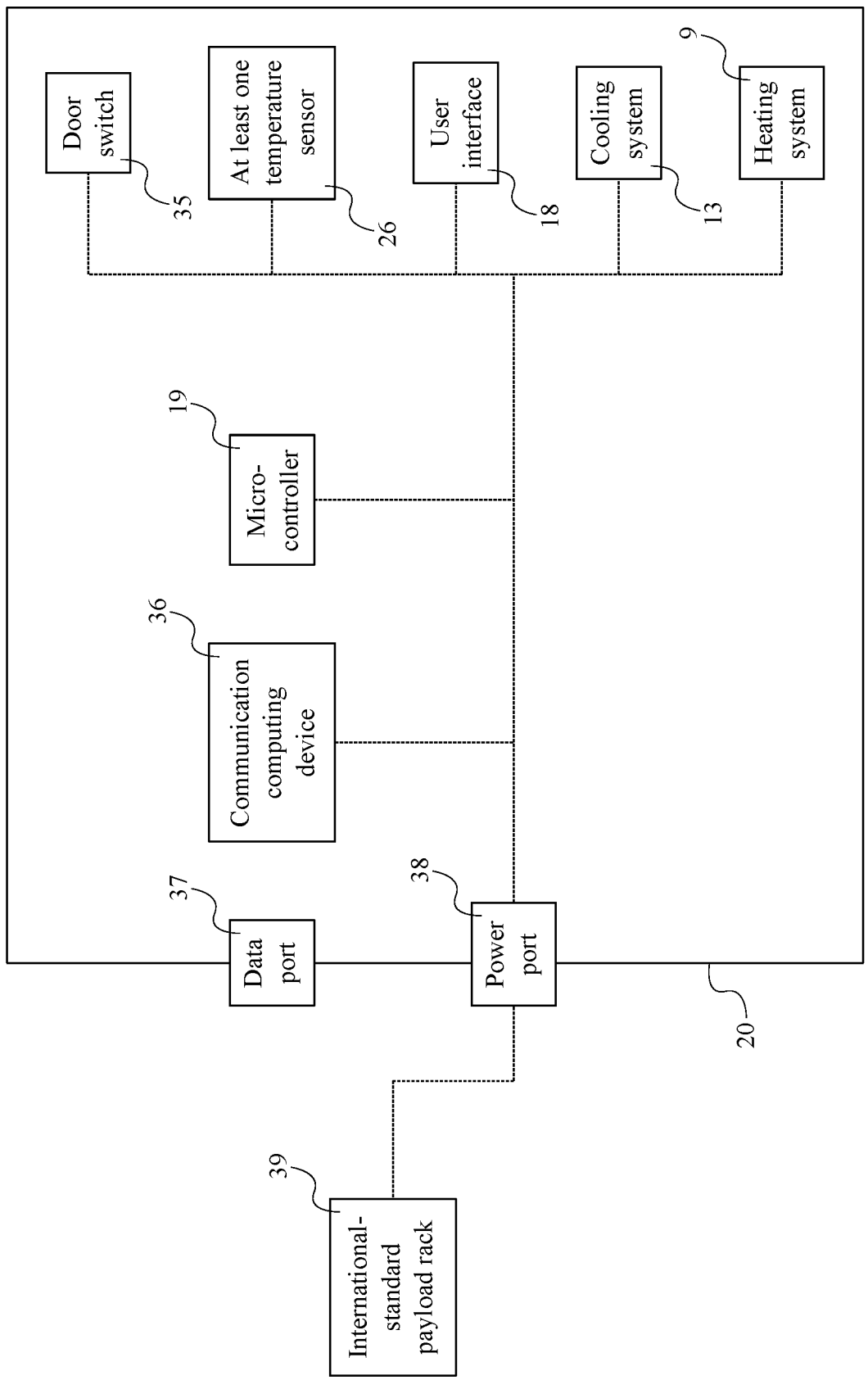
FIG. 11 is a schematic diagram illustrating the electrical connections of the present invention.

In order for the present invention to communicate and receive electrical power from a space station and with reference to FIGS. 10 and 11, the present invention may further comprise a data port 37, a power port 38, and an international-standard payload rack 39. The data port 37 and the power port 38 are integrated into the enclosure 20. In further detail, the data port 37 and the power port 38 are standard power and ethernet connections for devices to interface with a space station. The enclosure 20 is mounted into the international-standard payload rack 39 through a set of fasteners in order for the international-standard payload rack 39 to protect and hold the enclosure 20 in place. The international-standard payload rack 39 is electronically connected to the communication computing device 36 by the data port 37. This allows data to be relayed between the present invention, through the international-standard payload rack 39, and a space station. The international-standard payload rack 39 is electrically connected to the heating system 9, the cooling system 13, the user interface 18, the microcontroller 19, the at least one temperature sensor 26, and the communication computing device 36 by the power port 38. This allows 28 Volts direct current (DC) power to be supplied to the present invention via the international-standard payload rack 39. The electrical power from the space station is conditioned by a power supply of the present invention to provide 28 Volts DC power to the heating system 9 and 5 Volts DC power to the cooling system 13, the user interface 18, the microcontroller 19, the at least one temperature sensor 26, and the communication computing device 36.

Although the invention has been explained in relation to its preferred embodiment, it is to be understood that many other possible modifications and variations can be made without departing from the spirit and scope of the invention as hereinafter claimed.

What is claimed is:

1. A space oven, comprising:
an enclosure;
a tubular chamber mounted within the enclosure and including an open chamber end and a closed chamber end;
a heating rack mounted within and centrally positioned along the tubular chamber, and that includes a first track and a second track, wherein:
the first track and the second track traverse from the open chamber end to the closed chamber end; and
the first track and the second track are positioned opposite to each other within the tubular chamber;
a heating system mounted within the tubular chamber and distributed around the heating rack;
a cooling system integrated into the enclosure;
a hatch operatively mounted to the open chamber end, wherein the hatch is usable to selectively access the open chamber end;
a user interface mounted within the enclosure;
at least one first vent integrated into the hatch;
at least one second vent integrated into the closed chamber end;
at least one temperature sensor mounted into the closed chamber end; and
a microcontroller mounted within the enclosure and electronically connected to the heating system, the cooling system, the user interface, and the at least one temperature sensor; and
a heating tray that includes a first sealing assembly and a second sealing assembly and that is slidably engaged in between the first track and the second track, wherein:
the first sealing assembly and the second sealing assembly each include a flexible sheet, a rigid frame, and a pressure-release valve;
the pressure-release valve is integrated into the flexible sheet;
the rigid frame is perimetrically connected around the flexible sheet; and
the rigid frame of the first sealing assembly is hermetically connected onto the rigid frame of the second sealing assembly.

2. The space oven as claimed in claim 1, further comprising:
a quantity of insulation material, wherein:
the tubular chamber includes an inner lateral wall and an outer lateral wall;
the inner lateral wall is concentrically encircled by the outer lateral wall; and
the quantity of insulation material is positioned between the inner lateral wall and the outer lateral wall.

3. The space oven as claimed in claim 1, wherein:
the heating system includes a plurality of first standoffs, a plurality of second standoffs, and at least one heating wire;
the plurality of first standoffs are mounted adjacent to the open chamber end;
the plurality of second standoffs are mounted adjacent to the closed chamber end;
the plurality of first standoffs and the plurality of second standoffs are distributed around the heating rack; and
the at least one heating wire is strung in between the plurality of first standoffs and the plurality of second standoffs.

4. The space oven as claimed in claim 1, wherein:
the cooling system includes an inlet fan assembly, an outlet fan assembly, and a plurality of airflow-guiding panels;

the inlet fan assembly and the outlet fan assembly are positioned adjacent to the closed chamber end;

the inlet fan assembly is positioned offset from the outlet fan assembly;

the inlet fan assembly is in fluid communication with the outlet fan assembly through the plurality of airflow-guiding panels, the at least one first vent, and the at least one second vent;

a first airflow path is delineated from the inlet fan assembly, in between the open chamber end and the closed chamber end, and to the outlet fan assembly; and a second airflow path is delineated from the inlet fan assembly, across the hatch and to the outlet fan assembly.

5. The space oven as claimed in claim 4, further comprising:

at least one cooling rack, wherein:

the at least one cooling rack is mounted within the enclosure;

the at least one cooling rack is positioned adjacent to the open chamber end;

the first airflow path is intersected by the at least one cooling rack; and the second airflow path is intersected by the at least one cooling rack.

6. The space oven as claimed in claim 1, wherein:

the enclosure includes a receptacle and a cover;

the receptacle includes an opening;

the open chamber end, the user interface, and the microcontroller are positioned adjacent to the opening;

the cooling system is positioned opposite to the opening about the enclosure;

the receptacle is perimetrically attached to the cover; and the cover is positioned across the opening.

7. The space oven as claimed in claim 1, wherein:

the at least one temperature sensor is an automated shutoff thermostat.

8. The space oven as claimed in claim 1, further comprising:

a door switch, wherein:

the door switch is operatively integrated in between the hatch and the open chamber end;

the door switch is usable to detect a closed configuration for the hatch and an open configuration for the hatch; and the microcontroller is electronically connected to the door switch.

9. The space oven as claimed in claim 1, further comprising:

a communication computing device, wherein:

the communication computing device is mounted within the enclosure; and the communication computing device is electronically connected to the microcontroller.

10. The space oven as claimed in claim 9, further comprising:

a data port;

a power port; and an international-standard payload rack;

wherein:

the data port and the power port are integrated into the enclosure;

the enclosure is mounted into the international-standard payload rack;

the international-standard payload rack is electronically connected to the communication computing device by the data port; and the international-standard payload rack is electrically connected to the heating system, the cooling system, the user interface, the microcontroller, the at least one temperature sensor, and the communication computing device by the power port.

* * * * *